(12) United States Patent
Welle et al.

(10) Patent No.: US 8,776,594 B2
(45) Date of Patent: Jul. 15, 2014

(54) AMPLITUDE PROFILING IN FILLING-LEVEL MEASURING DEVICES

(75) Inventors: Roland Welle, Oberwolfach (DE); Karl Griessbaum, Muehlenbach (DE); Juergen Motzer, Gengenbach (DE); Martin Gaiser, Alpirsbach (DE); Christian Hoferer, Offenburg (DE); Manuel Kaufmann, Gengenbach (DE); Joachim Benz, Hausach (DE)

(73) Assignee: VEGA Grieshaber KG, Wolfach (DE)

( * ) Notice: Subject to any disclaimer, the term of this patent is extended or adjusted under 35 U.S.C. 154(b) by 368 days.

(21) Appl. No.: 13/182,636

(22) Filed: Jul. 14, 2011

(65) Prior Publication Data

US 2012/0174664 A1 Jul. 12, 2012

Related U.S. Application Data

(60) Provisional application No. 61/365,596, filed on Jul. 19, 2010.

(30) Foreign Application Priority Data

Jul. 19, 2010 (EP) .................................... 10170031

(51) Int. Cl.
*G01N 23/00* (2006.01)
(52) U.S. Cl.
USPC .............. 73/290 V; 73/1.73; 367/99; 367/908
(58) Field of Classification Search
USPC .......... 73/1.73, 290 V; 324/637–646; 342/59, 342/82–103, 118, 124–145, 175, 188–197, 342/165–174; 367/87, 98, 99, 178, 179, 367/908; 702/55, 85, 100, 108, 116
See application file for complete search history.

(56) References Cited

U.S. PATENT DOCUMENTS

| 5,323,361 | A | | 6/1994 | Elle et al. |
|---|---|---|---|---|
| 5,587,969 | A | * | 12/1996 | Kroemer et al. ................ 367/99 |
| 5,614,911 | A | | 3/1997 | Otto et al. |
| 6,169,706 | B1 | * | 1/2001 | Woodward et al. ............ 367/99 |

(Continued)

FOREIGN PATENT DOCUMENTS

| DE | 43 32 071 | 3/1995 |
|---|---|---|
| DE | 10 2007 042 042 | 3/2003 |

(Continued)

OTHER PUBLICATIONS

Devine, "Radar Level Measurement", The Users Guide, 2000, 17 sheets.

*Primary Examiner* — Hezron E Williams
*Assistant Examiner* — Hoang Nguyen
(74) *Attorney, Agent, or Firm* — Fay Kaplun & Marcin, LLP

(57) ABSTRACT

An electronics unit and a method for a filling-level measuring device for determining a filling level. The unit including an arithmetic unit determining a functional relationship between a distance between a filling material surface and the filling-level measuring device and an amplitude of a signal component reflected by the filling material surface and received by the filling-level measuring device; an amplitude profiler creating a profile of amplitude values of filling level echoes which have been measured so far; and an amplitude evaluator determining an expected amplitude of the filling level echo at a particular location with help of the profile of amplitude values.

13 Claims, 9 Drawing Sheets

(56) References Cited

U.S. PATENT DOCUMENTS

| | | | |
|---|---|---|---|
| 6,816,436 B1 * | 11/2004 | Bachert | 367/99 |
| 7,046,189 B2 | 5/2006 | Spanke et al. | |
| 7,098,843 B2 | 8/2006 | Abrahamsson | |
| 7,730,760 B2 | 6/2010 | Schroth et al. | |
| 7,966,141 B2 | 6/2011 | Spanke et al. | |
| 2009/0007627 A1 * | 1/2009 | Perl et al. | 73/1.73 |
| 2009/0013778 A1 * | 1/2009 | Schroth et al. | 73/290 V |
| 2009/0299662 A1 * | 12/2009 | Fehrenbach et al. | 702/55 |
| 2011/0166805 A1 | 7/2011 | Hammer et al. | |

FOREIGN PATENT DOCUMENTS

| | | |
|---|---|---|
| DE | 102 60 962 | 7/2004 |
| DE | 10 2004 055 551 | 5/2006 |
| DE | 10 2005 003 152 | 7/2006 |
| EP | 0 573 034 | 12/1993 |
| WO | 2009/037000 | 3/2009 |

* cited by examiner

| ID | Echoanfang/m | Echoposition/m | Echoende/m | Amplitude/dB |
|---|---|---|---|---|
| $E_0$ | 1.60 | 2.00 | 2.30 | 55 |
| $E_1$ | 3.00 | 3.20 | 3.50 | 65 |

| Filling-level echo structure | |
|---|---|
| Filling level echo valid | ja |
| Filling-level echo start /m | 3.00 |
| Filling-level echo position /m | 3.20 |
| Filling-level echo end /m | 3.50 |
| Filling level amplitude /dB | 65 |
| Reliability of the decision | 100% |
| Extent of movement of the echo | 100% |

Fig. 10

AMPLITUDE PROFILING IN FILLING-LEVEL MEASURING DEVICES

REFERENCE TO RELATED APPLICATIONS

This application claims the benefit of the filing date of EP Patent Application Serial No. EP 10 170 031.8 filed 19 Jul. 2010, the disclosure of which is hereby incorporated herein by reference and of U.S. Provisional Patent Application Ser. No. 61/365,596 filed 19 Jul. 2010 the disclosure of which is hereby incorporated by reference.

TECHNICAL FIELD

The present invention relates to a method for measuring all kinds of filling levels, for example methods based on ultrasonic signals, radar signals, microwave signals or vibrations. In particular, the invention relates to an electronics unit for a filling-level measuring device, to a filling-level measuring device with an electronics unit, to the use of a filling-level measuring device, and to a method for filling level measuring.

BACKGROUND TO THE INVENTION

Peter Devine: "Füllstandmessung mit Radar—Leitfaden für die Prozessindustrie" describes the basic design of commercial radar filling-level measuring devices.

DE 10 2005 003 152 A1 describes a method in which the proper functioning of a filling-level measuring device is checked.

U.S. Pat. No. 7,098,843 B3 describes a method in which the amplification of a receive amplifier is changed depending on the distance to the source of the signal.

WO 2009/037000 A1 describes methods for the extraction of echoes and methods for tracking.

Meinke/Gundlach: "Taschenbuch der Hochfrequenztechnik" (handbook of high-frequency engineering) describes the approach for predicting the expected echo amplitude by means of the radar equation.

DE 102 60 962 A1 describes a method for storing echo functions.

Known methods are often expensive and sometimes inaccurate.

SUMMARY OF THE INVENTION

It may be desirable to have a method and an associated device that make it possible to determine the filling level with high accuracy.

According to a first aspect of the invention, an electronics unit for a filling-level measuring device for determining a filling level is stated. The electronics unit comprises an arithmetic unit that is designed to determine a functional relationship between the distance between a filling material surface (also called "feed material surface") and the filling-level measuring device and an amplitude of a signal component reflected by the feed (i.e. filling) material surface and received by the filling-level measuring device.

By determining the functional relationship between the filling level (which can be determined from the distance between the feed material surface and the filling-level measuring device) and the amplitude of the received signal component the electronics unit can carry out an evaluation of the echoes received (for example later). In particular it is possible to determine whether a particular echo is an echo that represents the filling level, or whether it is an artifact, in other words a "false" echo, which is, for example, due to multiple reflections in the container or due to a container installation.

By evaluating the amplitude of corresponding received signal components of the echo curve, one of the signal components being, for example, the filling level echo, it is thus possible to increase the probability of the filling level echo being correctly identified. Furthermore, it is possible to detect an overfill state.

In particular, the electronics unit may be adapted to create (determine) a profile of previously determined amplitude values of identified filling level echoes of previously acquired echo curves (wherein each echo curve has been measured at a different time and may comprise a plurality of echoes, on being the filling level echo). This may be done by an amplitude profiler. After that, an amplitude evaluator may analyze the profile of the corresponding amplitude values and, based on the analysis, determine an amplitude of the filling level echo, which is expected when a certain filling level has been reached.

According to an exemplary embodiment of the invention, the electronics unit furthermore comprises a storage device, wherein the functional relationship between the filling level and the amplitude of the received signal component is stored in the storage device in the form of grid points.

Based on these grid points, extrapolation can take place and in this manner the expected amplitudes can be predicted (the amplitude can change as the filling level changes).

According to a further exemplary embodiment of the invention, the functional relationship is produced by adjusting the coefficients of a mathematical equation.

In this manner a precise forecast of amplitude values that are to be expected in future is possible.

According to a further exemplary embodiment of the invention, the functional relationship is used for evaluating the echoes of an echo list.

Moreover, for evaluating the echoes of the echo list, still further criteria can be drawn up, for example trend calculations, expectation windows within which the filling level very probably should be positioned, or other plausibility considerations.

According to a further exemplary embodiment of the invention, the functional relationship is determined only when the filling-level measuring device has identified the filling level with good or even high reliability.

It is thus possible to prevent a false value relating to the functional relationship between the amplitude value and the filling level from being used for subsequent calculations.

According to a further exemplary embodiment of the invention, determining the functional relationship is carried out only when the echo of the feed material surface changes its position over several measuring cycles.

In this manner unnecessary arithmetic work may be avoided.

According to a further exemplary embodiment of the invention, when determining the functional relationship at least one statistical parameter relating to the filling level amplitude is determined.

According to a further exemplary embodiment of the invention, the at least one statistical parameter relating to the filling level amplitude is used for evaluating the echoes of an echo list.

In this manner the probability of a false echo erroneously being classified as a filling level echo may be reduced.

According to a further exemplary embodiment of the invention, the functional relationship is used for detecting the occurrence of an overfill situation.

The filling-level measuring device can thus in an automated manner deduce overfilling of the container.

According to a further exemplary embodiment of the invention, the occurrence of an overfill situation is signaled to the user and/or to a higher-level control system.

According to a further exemplary embodiment of the invention, the storage device comprises a non-volatile storage region. In this process the occurrence of an overfill situation, the functional relationship, and/or the at least one statistical parameter relating to the filling level amplitude is stored in the non-volatile storage region, after the corresponding value has been obtained.

According to a further exemplary embodiment of the invention, within the tracking in particular the course of the location of an echo over several individual measurements is tracked, and this collected information is stored in the non-volatile storage region in the form of a track.

According to a further exemplary embodiment of the invention, the information stored in the non-volatile storage region is read when the measuring device resumes operation, and is used for evaluating echoes.

In this manner even in the case of a restart of the measuring device it may be ensured that the echoes of an echo curve are correctly classified, or that the filling level is correctly calculated.

According to a second aspect of the invention, a filling-level measuring device with an electronics unit described above and below is stated.

According to a further aspect of the invention, the use of a filling-level measuring device with an electronics unit described above and below in an application in which overfilling may occur is stated.

According to a further aspect of the invention, a method for determining a filling level with a filling-level measuring device is stated. In the method a transmit signal is emitted to a feed material surface. Thereafter a receive signal that corresponds to the transmit signal is detected by a corresponding receiving device of the filling-level measuring device. This is followed by determination of the functional relationship between the distance between the feed material surface and the filling-level measuring device and an amplitude of a signal component of the receive signal, which signal component is reflected by the feed material surface and is received by the filling-level measuring device.

At this stage it should be noted that the features described above and below in each case can apply to the electronics unit, the filling-level measuring device, the use and the method. In other words, for example, those features that are described above and below with a view to the electronics unit can also be implemented as method-related steps and vice versa.

Below, exemplary embodiments of the invention are described with reference to the figures.

BRIEF DESCRIPTION OF THE FIGURES

FIG. 10 shows a filling level echo-structure.

DETAILED DESCRIPTION OF EXEMPLARY EMBODIMENTS

Figure 1:
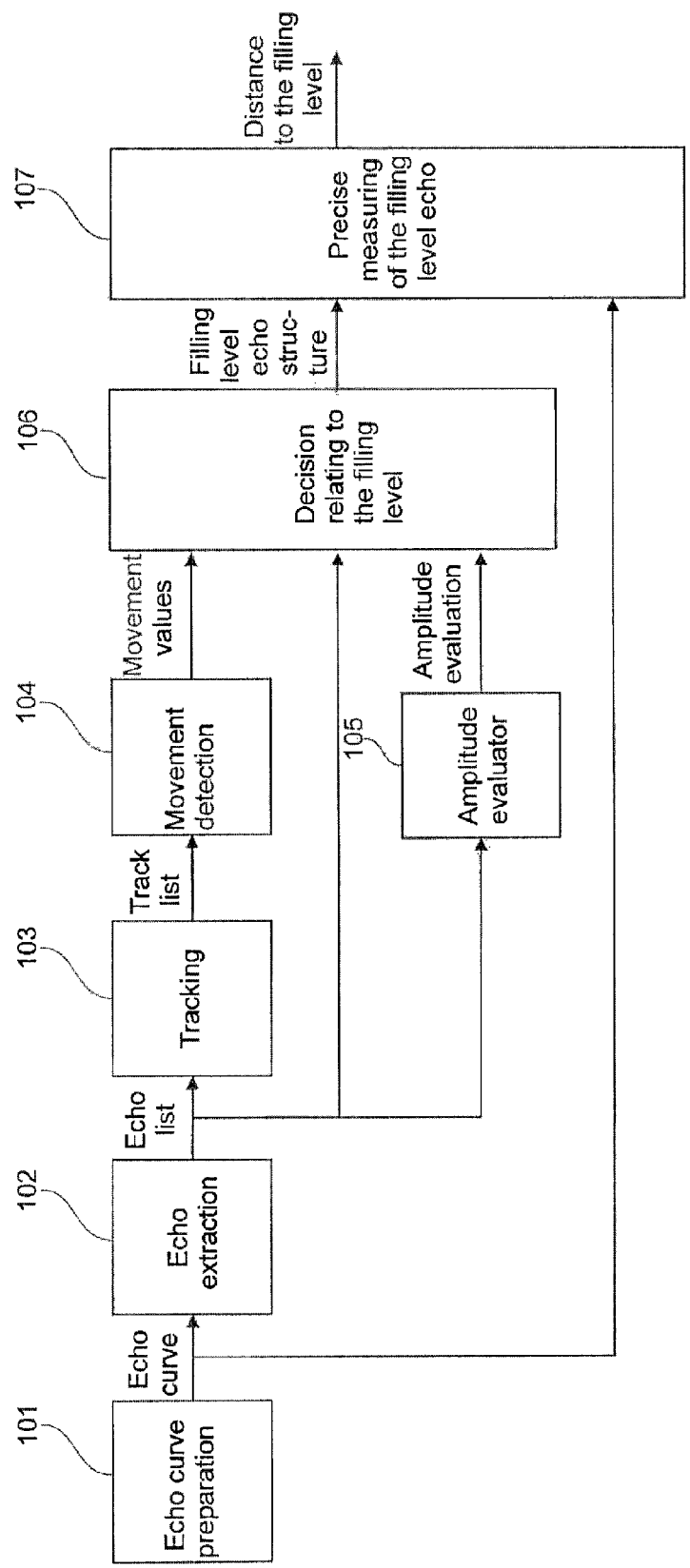
FIG. 1 shows a device for echo signal processing, for example an electronics unit.

The illustrations in the figures are diagrammatic and not to scale.

In the following description of the figures if the same reference characters are used they refer to identical or similar elements.

In the filling level sensors operating according to the FMCW or pulse transit-time method, electromagnetic or acoustic waves are emitted in the direction of a feed material surface. Subsequently, the sensor records the echo signals reflected by the feed material and by the container internals and from this derives the respective filling level.

FIG. 1 shows the basic design of echo signal processing within a filling-level measuring device.

The block "Echo curve processing" 101 comprises all the hardware units and software units that are required to provide an echo curve as an image of the then current reflection conditions within a container. The echo curve is preferably acquired in digital form within a microprocessor system and is investigated, with the use of known methods, for any echoes contained therein.

The methods applied for this purpose within the block "Echo extraction" 102 comprise, in particular, methods from the field of threshold-value-based echo extraction or methods based on scale-based echo extraction. After processing the echo extraction method a digital echo list is provided which preferably comprises details relating to the start, location, end and amplitude of one or several echoes contained in the echo curve.

In order to further increase the reliability of echo signal processing of a filling-level measuring device, the found echoes are placed within a historic context within the block "Tracking" 103. Within tracking, in particular, the progress of the location of an echo is tracked over several individual readings, and this collected information is represented in the storage device in the form of a track. According to an exemplary embodiment of the invention, this data (track) can also be stored in a non-volatile storage region. The collected history information of several echoes is made available externally in the form of a track list.

Based on the conveyed track list, in the block "Movement detection" 104 an analysis of the track list for continuous changes of an echo parameter, for example the echo location, is carried out. The results of this analysis are provided towards the outside in the form of movement values that correspond to the then current echoes of the echo list.

The echoes of the echo list, which are provided by echo extraction 102, are further investigated in the block "Amplitude evaluator" 105. In relation to each echo of the echo list the amplitude evaluator 105 determines the echo location and calculates the echo amplitude that can theoretically be expected at the location of the echo. If the amplitude of the echo precisely corresponds to the expected echo amplitude, a high amplitude evaluation is accorded to the echo.

However, if the actually present amplitude of the echo differs considerably from the expected ideal amplitude previously computed, then an amplitude evaluation of zero is accorded to the echo.

In the block "Decision about filling level" 106 the data of the current echo list, the movement values of the echoes determined thereto, and the results of the amplitude evaluation are balanced. In an ideal case the echo generated by a feed material surface is characterized in that among the multitude of echoes of the echo list it is the echo with the highest amplitude evaluation. In order to further improve the accuracy of filling level measuring the position of the determined filling level echo can be determined with high accuracy by the optional block "Precise measuring of the filling level echo" 107 with the use of computing-time-intensive methods, for example interpolation methods. The determined distance to the filling level is provided to the outside. This provision can be implemented in analogue form (4 . . . 20 mA interface) or in digital form (field bus).

Figures 2, 3:
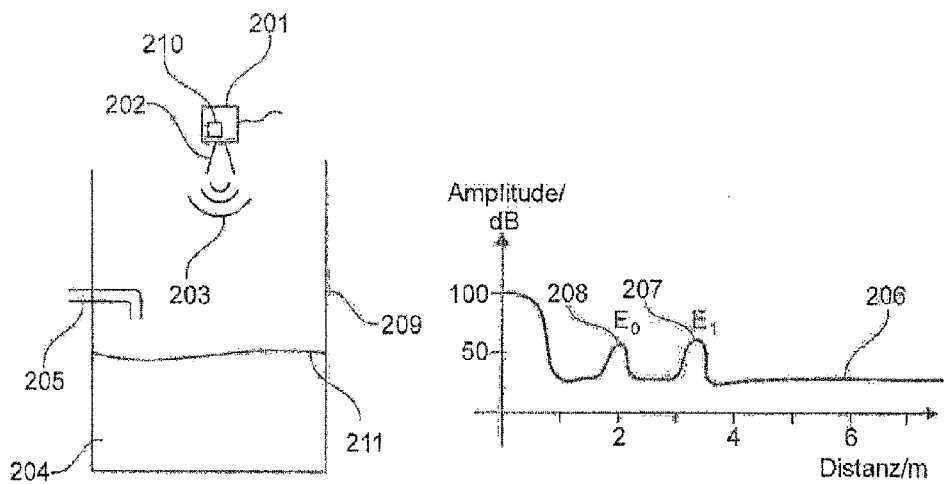
FIG. 2 shows a filling-level measuring device for measuring a filling level in a container according to an exemplary embodiment of the invention, as well as a corresponding echo curve.
FIG. 3 shows an echo list of a filling-level measuring device.

Advantages of the present invention may result from the special boundary conditions to which echo signal processing within a filling-level measuring device is subjected. FIG. 2 shows a typical application of such a device.

At this stage it should be pointed out that all the levels in the present text and in the associated figures are to be interpreted as relative levels. The absolute level, which is used as a reference variable in calculating the relative level, has no influence whatsoever on the function of the present invention.

By way of the antenna 202 the filling-level measuring device 201 emits a signal 203 in the direction of the medium 204 to be measured. By means of ultrasound, radar, laser or the principle of the guided microwave, the filling-level measuring device itself can determine the distance to the medium. Accordingly, both ultrasonic waves and electromagnetic waves can be considered as signals. The medium 204 reflects the impinging wave back to the measuring device, where said wave is received and processed. At the same time the emitted signal is also reflected by container internals, for example by an installed pipe 205. The echo curve 206 received in the filling-level measuring device can thus not only contain the filling level echo 207 caused by the filling level 211, but also echoes 208 of permanently installed interference positions 205, which echoes are hereinafter referred to as spurious echoes. In the present example the feed material container 209 is cylindrical in shape.

Within the then starting signal processing, the echo curve 206 is investigated in a targeted manner for echoes by means of the arithmetic unit 210. As a result of the echo extraction 102 an echo list 301 according to the diagram of FIG. 3 is generated. Apart from the characteristic values of the spurious echo E0 or 208, which spurious echoes are generated by the pipe 205, the echo list comprises a further echo E1 or 207, generated by the medium 204.

Of course, the shown characteristics of the echo list represent only one special implementation of an echo list. In practical application echo lists with further or with changed characteristics of an echo are also common.

Based on the generated echo list 301, in the further method sequence, specialized algorithms are used which make it possible to track the course of the location of individual echoes over several measurements. The methods used for this can take place according to the present state of the art; they are described in detail in the relevant literature under the term "tracking".

After completion of tracking 103, the local courses, determined in the form of a track list, of the individual echoes of the echo list are further processed in the block "Movement detection" 104. It is the object of this processing step to make a statement as to which echoes over several measurements move relative to their echo location, and which echoes behave in a stationary manner in relation to the determined echo location. The methods used at this point can also be implemented according to the present state of the art; they are, for example, described in detail in EP 10 156 793.1.

By means of the determined movement values it is then easy to identify the echo of the echo list 301, which echo has been generated by the feed material 204, since the echo after completed filling or emptying shows a pronounced movement value, whereas the values of the determined locations of the echoes of the interference position 205 have a pronounced stationarity.

However, this method may cause problems at the time of switching on and in the period of time up to the first filling or emptying of the container. Since without noticeable change in the filling height in the container none of the existing echoes shows pronounced movement, all the echoes of the echo list are assessed by the movement detection device as being stationary. Without further information it is not possible to make a decision as to which one of the identified echoes is the echo caused by the feed material 204.

In such cases the amplitude evaluator 105 assumes a central role within the signal processing chain of the filling-level measuring device. At this stage it should be pointed out that the logical division of the algorithmic steps according to FIG. 1, which steps need to be carried out, represents merely one possible variant. Often the same method-related steps are divided into variously defined blocks. For example, the functionality of the "Amplitude evaluator" 105 can also be implemented within the "Decision relating to the filling level" 106.

It is the task of the amplitude evaluator 105 to evaluate the echoes of the then currently present echo list 301 in terms of their then present amplitude. In the case of a radar filling-level measuring device the idea on which this method-related step is based is derived from the general radar equation which is, for example, described in detail in "Meinke/Gundlach: Taschenbuch der Hochfrequenztechnik" (handbook of high-frequency engineering). In the case of filling level measuring by means of ultrasound or laser, corresponding physical laws can be found in the relevant literature.

Thus, for example by means of the radar equation it is possible to calculate in advance the receive level of the echo of an object in a distance known in advance if the transmit level is known. In relation to the various echoes of the echo list, the amplitude evaluator determines the theoretically to be expected echo amplitude with the use of mathematical equations, and compares said expected echo amplitude with the actually received amplitude of the respectively viewed echo. If the actually received echo amplitude corresponds to the theoretically to be expected amplitude of a filling level reflection at the corresponding position, then this relationship is transmitted in the form of a high amplitude evaluation of the corresponding echo to the decision relating to the filling level 106. If the received amplitude differs considerably from the echo amplitude to be expected from a feed material reflection, then this results in a low amplitude evaluation.

Within the decision relating to the filling level 106 it is then possible to implement reliable identification of the filling level echo even at the moment of switching on the filling-level measuring device or in the case where there is no movement, in that, for example, precisely that echo, whose amplitude evaluation is highest, of the echo list 301 is identified as a filling level echo.

In practical application the above-described method of amplitude evaluation may result time and again in problems.

Basically the validity of the radar equation can be limited to reflectors that are in the far field of a transmitting antenna. This condition is adequately met precisely in those circumstances when the distance between the object and the transmitter is significantly greater than the wavelength of the radar signal. In the present case of a filling-level radar device with a wavelength of typically 5 cm this condition is adequately met. Furthermore, as a further prerequisite it is necessary for the reflector to be measured to be covered by radiation over a large surface by the transmission lobe of the radar antenna used.

Figure 4:
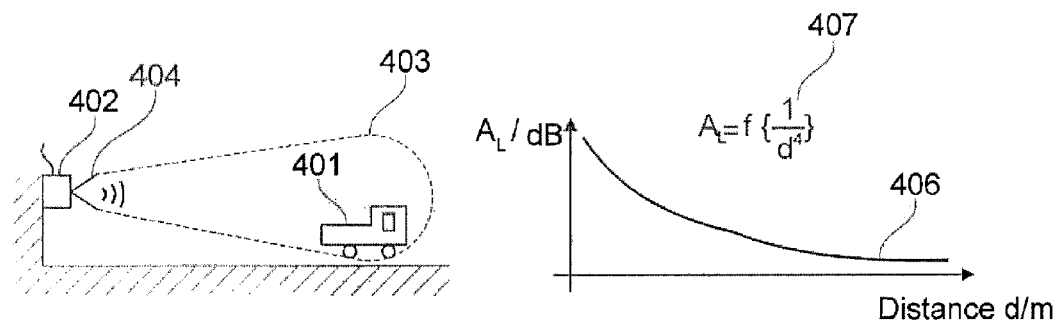
FIG. 4 shows a filling-level measuring device in object monitoring as well as a functional relationship according to an exemplary embodiment of the invention.

FIG. 4 shows an application case, which while atypical is basically nevertheless possible, of a filling-level measuring device in the context of object monitoring. The object 401 to be monitored is at adequate spacing from the measuring device 402 and is covered by radiation over a large surface by the transmission lobe 403 of the radar antenna 404. The transmission lobe of the radar antenna directly depends on the design of the antenna; it can be determined in advance with adequate accuracy with commonly used simulation programs for the respectively used antenna type. The boundary conditions for applying the radar equation to determine the theoretically to be expected receive level are adequately met for the application case of FIG. 4; the resulting function of the expected receive amplitude $A_L$ 406 of the echo of the object 401 is a function of the inverse distance d to the object, raised to the power of the exponent four 407 ($A_L \approx f(d^{-4})$).

Figure 5:
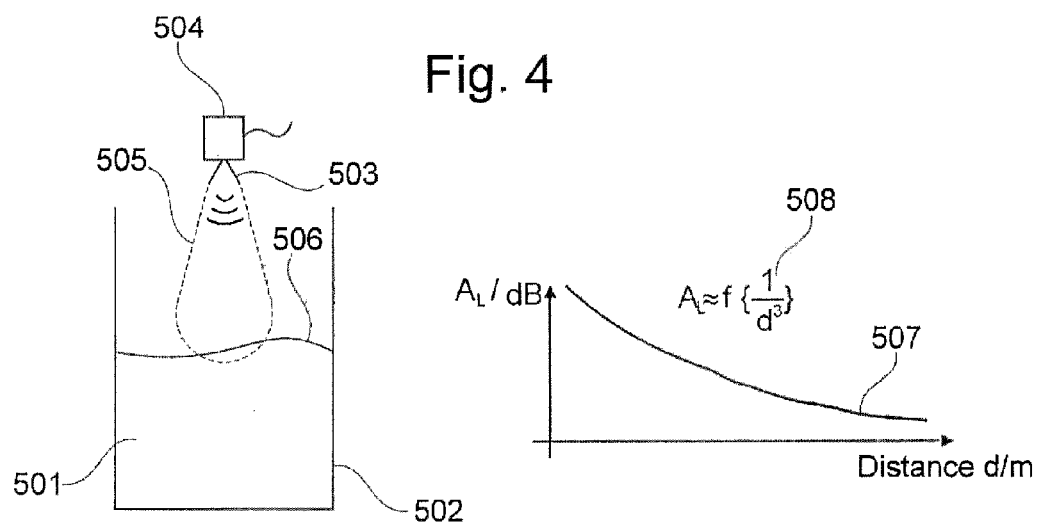
FIG. 5 shows a filling-level measuring device during measuring of liquids, as well as a corresponding functional relationship according to an exemplary embodiment of the invention.

FIG. 5 shows a further arrangement for measuring the filling height of a medium 501 within a container 502. The illustration directly shows that as a result of the short distance to the feed material the antenna lobe 505 that is associated with the antenna 503 of the filling-level measuring device 504 is not in a position to radiate over the entire surface 506 of the reflecting medium 501. Furthermore, in particular in the case of small containers, because of the resulting short distances to the feed material, a transition to the near field of the antenna can occur. Both effects bring about a situation in which the amplitude reflected by the feed material can no longer be forecast with adequate accuracy using the radar equation. Based on empirical values, the amplitude $A_L$ to be expected can approximately be determined in advance according to a function 507 that depends on the inverse distance d to the object, raised with the exponent three 508 ($A_L \approx f(d^{-3})$). Basically, however, in the context of this approach there is additionally a problem in that the function for calculating the expected receive amplitude in various respects depends on the geometry of the container 502 of the dielectric constant of the medium 501 and also on the antenna 503 used, which necessitates a relatively extensive input of parameters.

Figure 6:
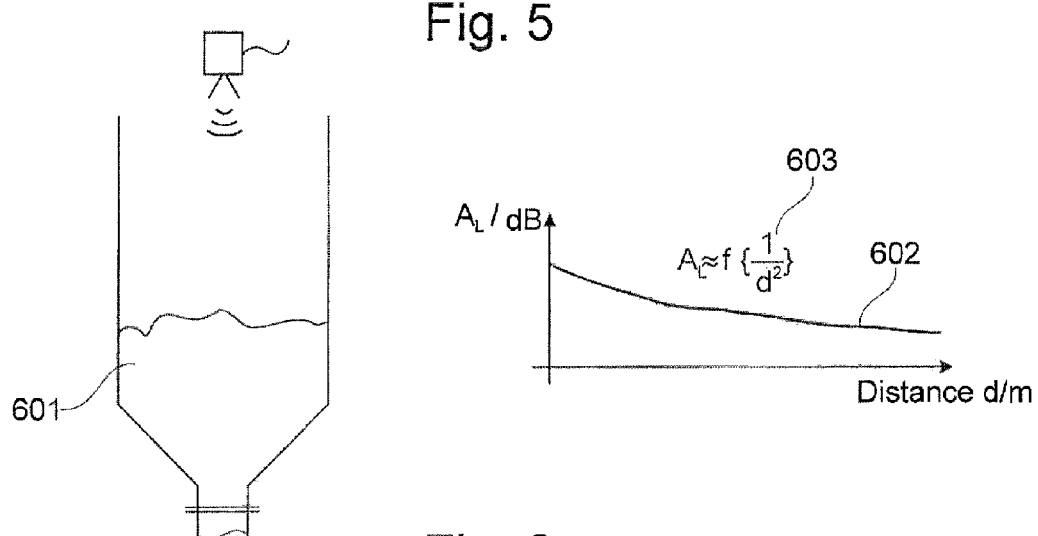
FIG. 6 shows a filling-level measuring device during measuring of bulk materials, as well as a corresponding functional relationship according to a further exemplary embodiment of the invention.

Even more difficult can be the circumstances when measuring bulk materials 601. FIG. 6 shows a corresponding arrangement. Empirical observations suggest a course 602 of the amplitude values to be expected, which course is a function 603 depending on the inverse quadratic distance of the reflector ($A_L \approx f(d^{-2})$). However, as is the case with liquids, in this case, too, adaptation of the function to the physical reality in the context of relatively extensive parameterizing needs to take place.

All previously described methods for determining the expected echo amplitude at a predeterminable location can only be used after corresponding parameterization of the device, and even then only produce inaccurate results. The disadvantages, shown as examples, in predicting the expected echo amplitude of the filling level echo also occur in the use of other measuring methods. For example, during measuring with ultrasound the actually received echo amplitude of the filling level echo is significantly attenuated by dust components in the container atmosphere, and thus differs significantly from the expected ideal amplitude of the filling level echo.

The present invention creates a suitable method for determining an expectation value relating to the amplitude of the filling level echo generated by the feed material surface.

Figure 7:
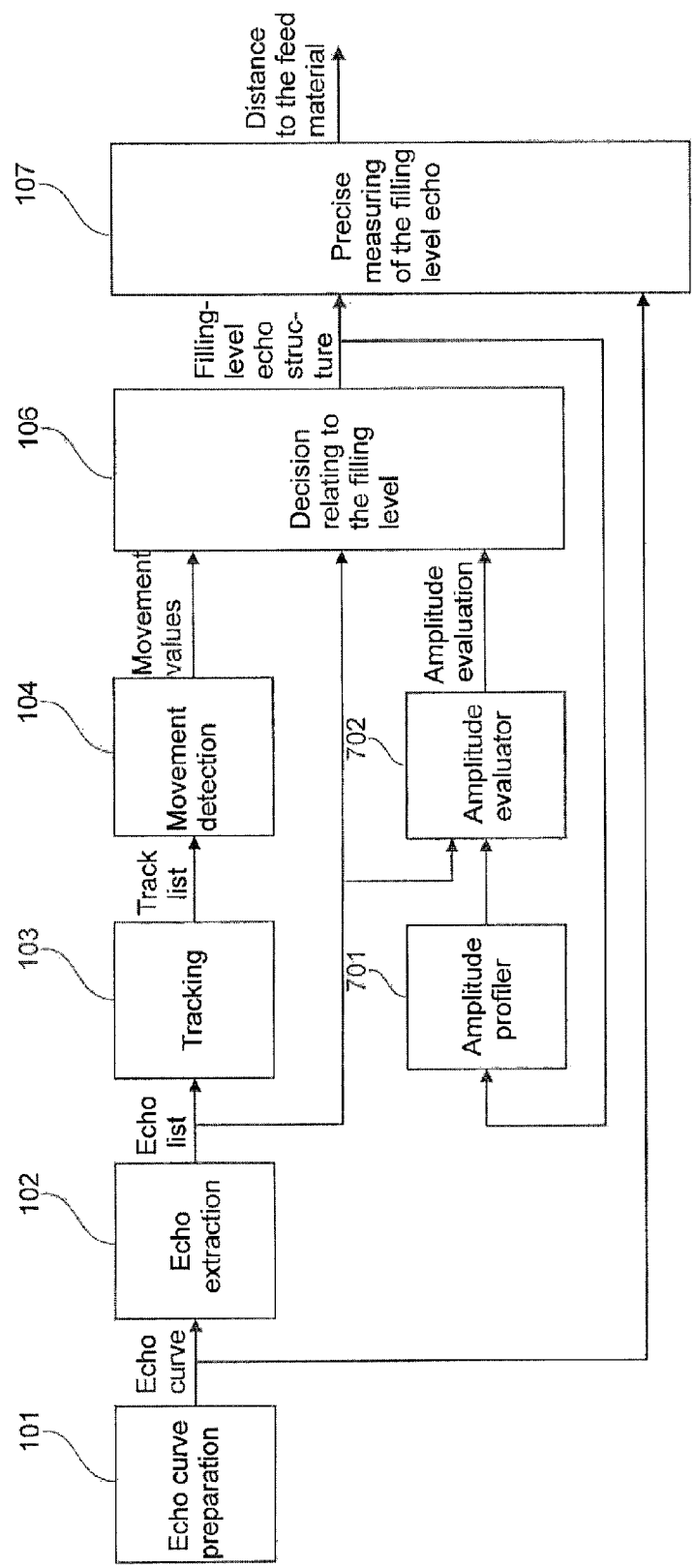
FIG. 7 shows a device for echo signal processing, for example in the form of an electronics unit, according to an exemplary embodiment of the invention.

The design of a signal processing unit shown in FIG. 7 largely corresponds to the design of FIG. 1, but it differs by the newly added processing unit "amplitude profiler" 701 and the modified processing unit "amplitude evaluator" 702.

It is a central idea of the present invention to implement the error-prone and elaborate determination of the expected amplitude of the filling level echo at a particular position not by means of mathematical equations but to replace them by automatically acquired application knowledge within the filling-level measuring device. To this effect the block "Amplitude profiler" 701 is advantageously used. It is the task of this unit to continuously monitor the filling level determined by the block "Decision relating to the filling level" and from this to prepare a profile of the hitherto observed amplitude values of the filling level echo. This amplitude profile is made available to the amplitude evaluator 702, which in turn makes it possible for said amplitude evaluator 702, by means of the conveyed amplitude profile, to determine the expected amplitude of the filling level echo at a particular location.

Figure 8:
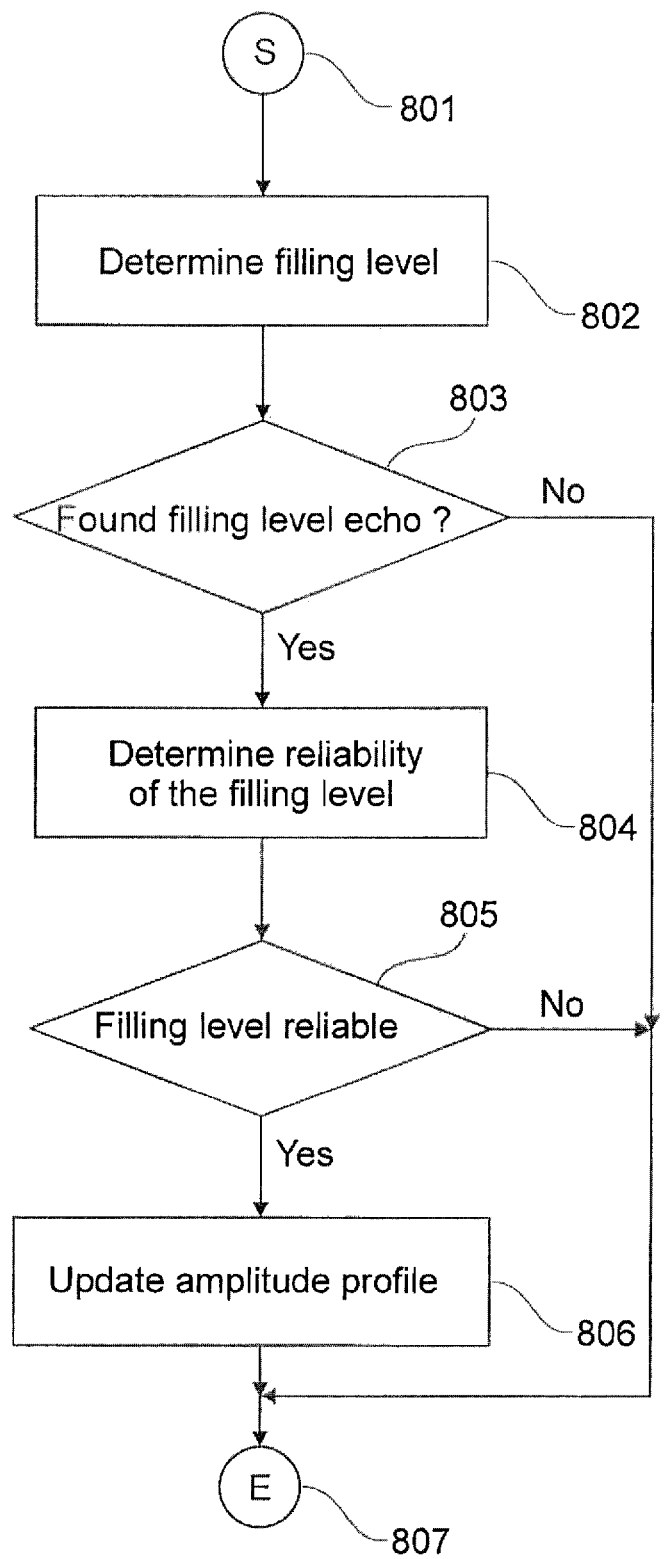
FIG. 8 shows a flow chart relating to filling level measuring.

FIG. 8 shows a flow chart for amplitude profiling in filling-level measuring devices. The shown sequence is run through in each measuring cycle of the filling-level measuring device. The method commences in the start state 801. In step 802 the actual filling level is determined. In this step almost all the method-related steps of a conventional filling-level measuring device are contained. In particular, in this step an echo curve is received, and echoes are extracted. The echoes are subsequently investigated for movement. Furthermore, the amplitudes of the echoes in the amplitude evaluator 702 are evaluated according to known methods. At startup of the system the amplitude profiler provides a curve comprising expected amplitude values, which curve can, for example, be firmly defined as a factory default. Furthermore, in this method-related step a decision concerning the then current filling level echo is calculated, and this filling level echo is provided to the outside in a structured form.

FIG. 10 shows an example of such a structure, which apart from the location of the filling level echo also comprises its amplitude and the reliability of the decision.

In step 803 the supplied filling-level echo information is investigated by the amplitude profiler 701. If a valid filling level echo is found, branching into step 804 takes place. Otherwise the method ends directly in the final state 807.

In step 804 the reliability of the filling-level echo information is considered. In other words, at this point an investigation takes place as to whether the block "Decision relating to the filling level" 106 has made its selection of an echo as a filling level echo with adequate certainty. For example, the reliability of the decision contained in the structure in FIG. 10, which can, for example, be derived from the signal-to-noise ratio of the filling level echo, can serve as a measure relating to the certainty of the decision. According to a further embodiment, the extent of the movement of the filling level echo can also be a measure relating to the certainty of the decision.

If the filling level echo has been reliably identified, then branching off to the method-related step 806 occurs. Otherwise the method ends in the final state 807.

In step 806 the amplitude profile is updated within the amplitude profiler 701. The amplitude which is in advance contained in the working memory at the position of the then current filling level echo is replaced within this method-related step by the amplitude of the then current filling level echo. Furthermore, it may be possible to persistently file the newly acquired amplitude value in a non-volatile storage device.

Figure 9:
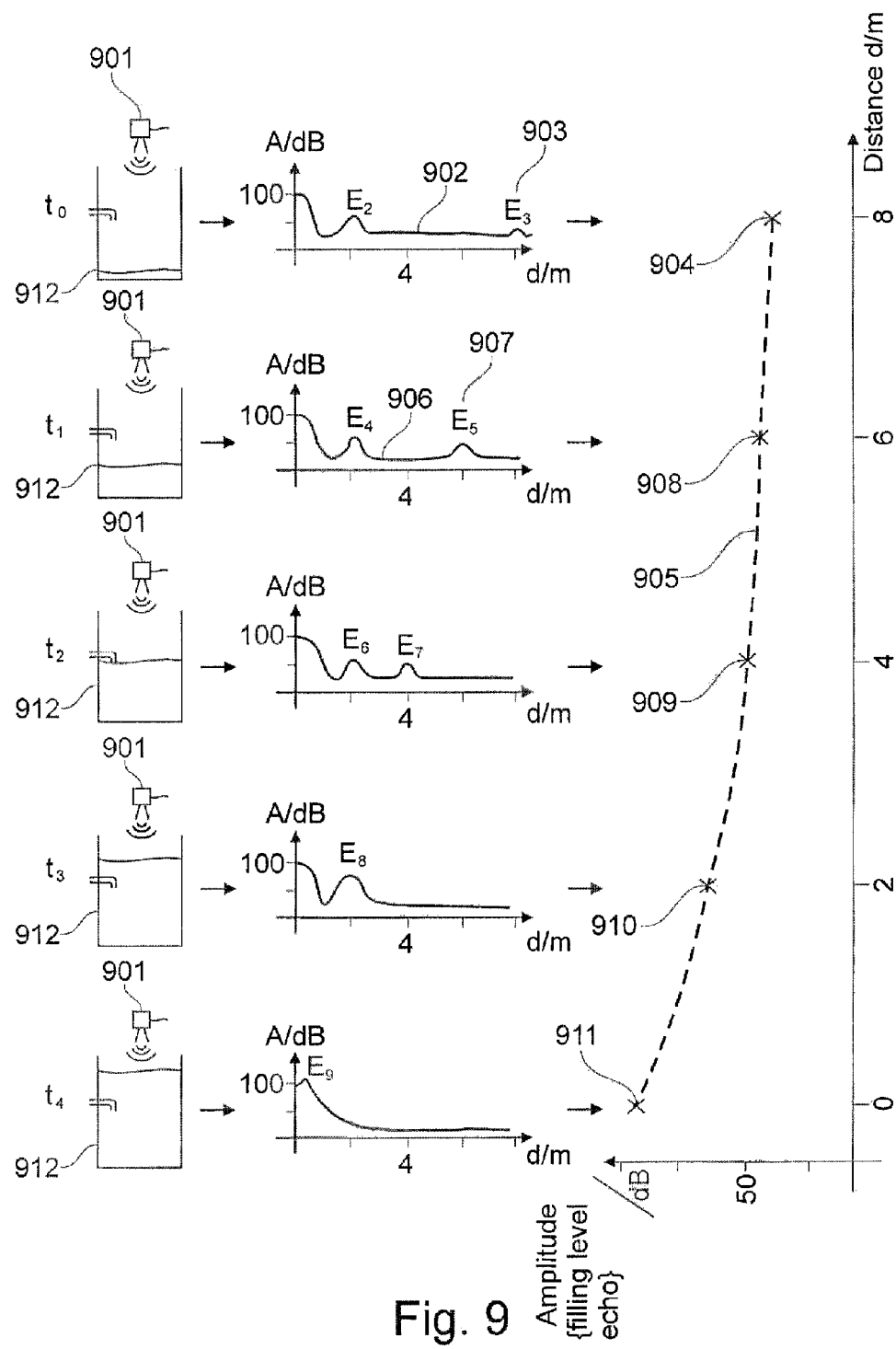
FIG. 9 shows amplitude profiling in the case of a still feed material surface according to an exemplary embodiment of the invention.

FIG. 9 as an example shows the process steps of the method with reference to the act of filling a container. The device is commissioned at the point in time $t_0$. Based on the evaluation criteria provided at the factory, the filling level measuring device 901 may make a decision relating to the echo E3 or 903 as the then current filling level by means of the then present echo curve 902. The amplitude profiler 701 takes over the echo amplitude of the filling level echo as a new grid point 904 in the amplitude profile 905 administered by it. Within the subsequent measuring cycle at the point in time $t_1$ the echo E5 or 907 is identified as the filling level by means of the echo curve 906. Based on this decision the amplitude profiler 701 updates its amplitude profile 905 around the grid point 908. During further operation of the filling-level measuring device the amplitude profile 905 is continually updated at the points in time $t_2$, $t_3$, $t_4$ by supplementation around the grid points 909, 910, 911. After the container 912 has been completely filled once, a completely learned amplitude profile 905 of the then current application is present in the amplitude profiler, which amplitude profile 905 can subsequently be used for the evaluation of echo lists.

At this stage it should be pointed out that according to a further exemplary embodiment, if applicable, any missing regions of the amplitude profile can be replaced by standard values defined at the factory. It is thus possible to provide the amplitude profile 905 to the amplitude evaluator 702 at any of the points in time $t_0$ to $t_4$.

According to a further exemplary embodiment it is also possible to interpolate missing amplitude values if already learned grid points are present, or to calculate the aforesaid by matching the parameters of mathematical equations (for example the radar equation) defined in advance.

The learned amplitude profile is advantageously copied to a non-volatile storage region of the sensor so that after a power failure said amplitude profile is immediately ready when the device resumes operation. Storing in the non-volatile storage region can take place in any of the measuring cycles, or in a previously defined time grid, or in an event-controlled manner, for example if there is a change in the filling height.

When compared to the current state of the art the proposed embodiment provides an advantage in that it produces a precise application-specific image of the amplitude of the filling level echo without this necessitating any user-initiated action. When a particular filling height of the medium has been reached anew, the amplitude, once defined, is reproduced again in this manner with great accuracy, provided the medium in the container is a medium with a still surface.

Other conditions result in the case of moving surfaces of liquids, or in the case of differently profiled surfaces of the layers of a measured bulk material.

Figure 11:
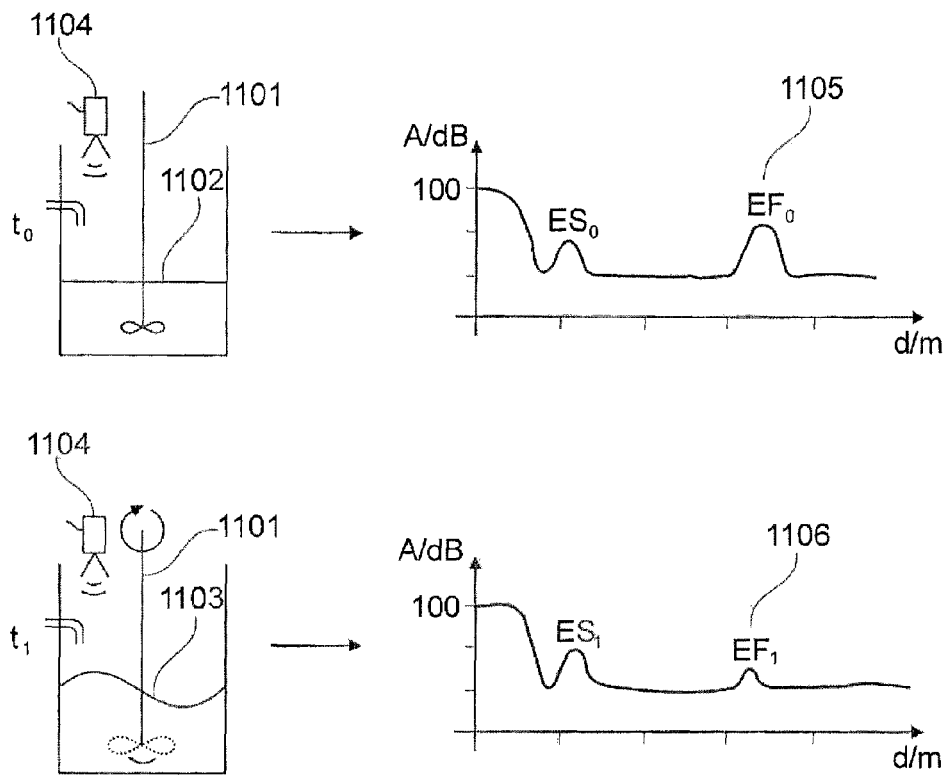
FIG. 11 shows echo signals in the case of a moving feed material surface.

FIG. 11 illustrates the problems encountered in the case of a moving surface of a liquid. At the point in time $t_0$ an amplitude of, for example, 70 dB is determined in relation to the filling level echo EF0 1105 and is stored by the amplitude profiler 701 as a grid point in the amplitude profile 905. If the agitator 1101 situated in the container is started up at the point in time $t_1$, then instead of the level liquid surface 1102 a funnel 1103 will be formed that in addition moves around the agitator 1101. The filling-level measuring device 1104 will then at an identical location detect an echo EF1 1106 which, however, due to the disturbed reflection surface 1103, only comprises a reduced amplitude of, for example, 55 dB.

According to a further embodiment of the method, the amplitude profiler 701 may then be modified in such a manner that it is in a position to calculate statistics relating to the amplitude values, conveyed to it, of the filling level echo.

Figure 12:
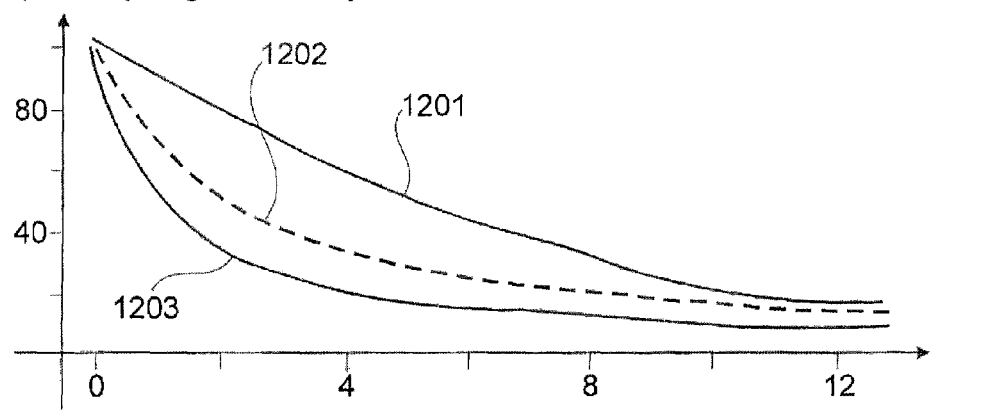
FIG. 12 shows three amplitude profiles according to a further exemplary embodiment of the invention.

FIG. 12 shows the amplitude profile as it can be prepared by an amplitude profiler that has been enlarged to comprise statistics calculations. In the present example the amplitude profile comprises the mean value curve 1202, which can be calculated continuously by forming the mean values of all the filling level amplitudes at a position. The curve 1201 describes the maximum amplitude value of an echo, which amplitude value has been acquired in one position, while the curve 1203 describes the minimum acquired filling-level amplitude value in one position. According to this further embodiment of the method, all three statistics curves 1201, 1202, 1203 may be conveyed to the amplitude evaluator 702. Accordingly, an echo of the echo list will be given a high amplitude evaluation by the amplitude evaluator 702 precisely in those cases where its amplitude is in the region between the minimum curve 1203 and the maximum curve 1201. As an alternative it is also possible to use the distance of the actually measured amplitude of an echo from the mean value curve 1202 during calculation of the amplitude evaluation.

According to a further embodiment of the method, it may also be possible to derive the upper statistics curve 1201 and the lower statistics curve 1202 from other statistical relationships, for example from the variance.

Of course, the determined statistics values can be stored in the volatile and/or non-volatile storage region of a filling-level measuring device. Storing can take place in any one of the measuring cycles, or it can take place in a time grid defined in advance or in an event-controlled manner, for example during a change in the filling height.

Figure 13:
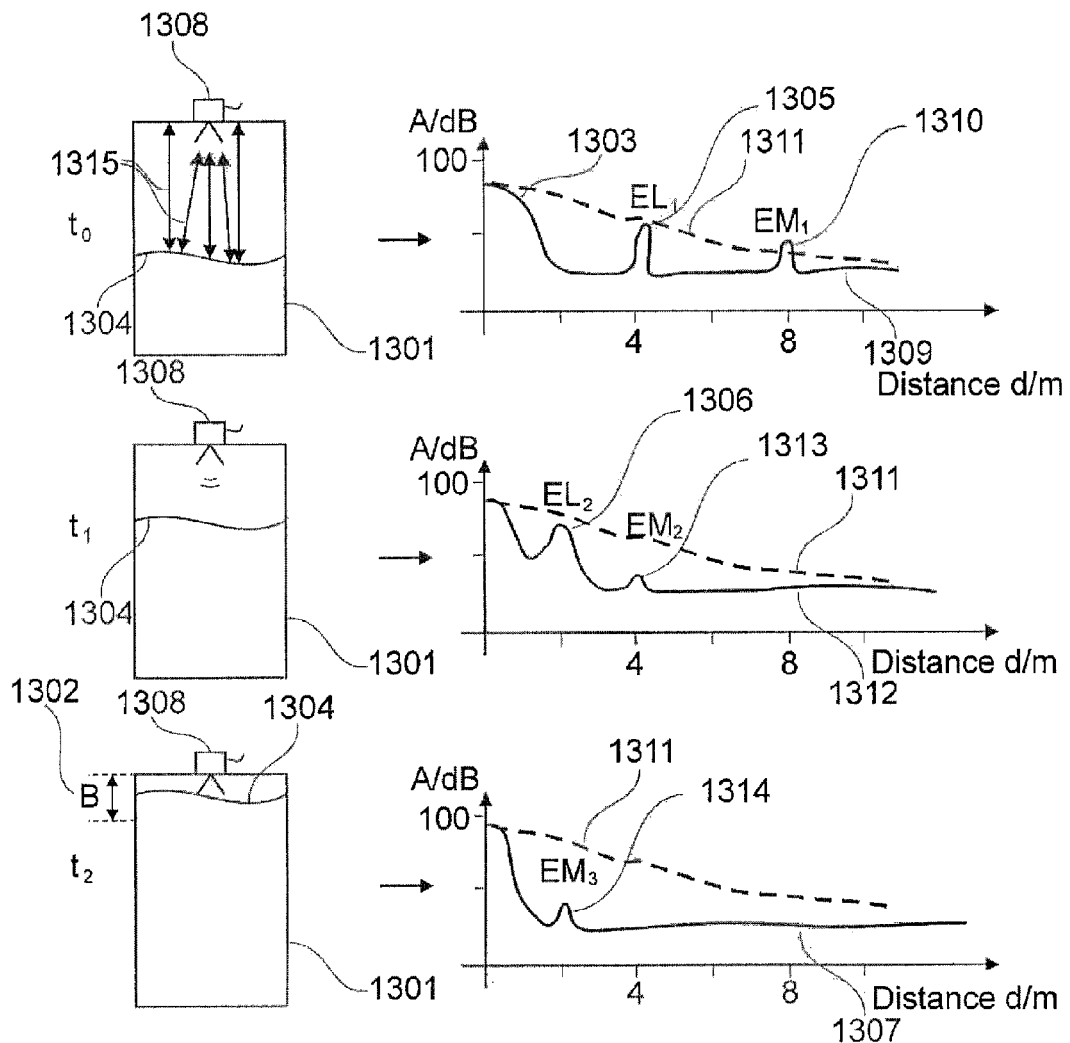
FIG. 13 shows examples of filling level measuring with an overfull container.

FIG. 13 shows a particularly advantageous application of the method according to the invention with reference to a container 1301 that, for example, is to be completely filled. If in an application the block distance B 1302 of typically 50 cm between the filling-level measuring device and the medium to be measured, which is standard in filling-level measuring devices, is not reached, this is generally-speaking referred to as overfilling of the container. Such overfilling represents a non-specified application of a filling-level measuring device; as a rule this is to be prevented by the user. This requirement is due to the fact that in the range up to, for example, 50 cm, relatively strong reflection 1303 of the antenna of the filling-level measuring device is received. If in this region there is additionally an echo 1305, 1306 of the feed material surface 1304, then there is mutual interference between the echo of the antenna and the echo of the feed material, which results in a situation where said feed material can no longer be pinpointed by means of the echo curve 1307.

Irrespective of these boundary conditions, in the context of ASSET services it is a declared objective that reliable acquisition of an overfill situation within a container is possible. If a filling-level measuring device detects inadmissible overfilling of a container, it can react to this in a targeted manner. For example, it may be possible to output a filling level of 110% to the outside, in order to inform a user that the container is overfull. Furthermore, it may also be possible to output an interference current by way of a 4 to 20 mA interface in order to inform the user that the equipment is being operated outside the valid specifications. Furthermore, the occurrence of an overfill situation can persistently be stored by the device in an event storage device in order to facilitate targeted problem analysis should a service assignment become necessary.

The mechanisms which would make the application of the present invention in the context of overfilling detection appear particularly advantageous will be shown in detail below with reference to FIG. 13.

At the point in time $t_0$ the filling-level measuring device 1308 emits a signal in the direction of the feed material surface 1304 to be measured. The feed material is situated in a container 1301 that is closed towards the top. Apart from the reflection EL1 1305, which is caused by the feed material, the echo curve 1309 subsequently received by the device comprises a further reflection, EM1 1310, which is caused by a multiple reflection of the medium/container top/medium 1315. Furthermore, it is assumed that in the operation so far of the filling-level measuring device 1308 the amplitude profiler 701 contained therein has already been able to prepare an amplitude profile 1311 of the container. The amplitude profile 1311 of the container is also shown in the coordinate system of the echo curve profile. The illustration clearly shows that the filling level echo EL1 1305 exactly matches the amplitude profile 1311 of the amplitude profiler 701 at the location of the filling level of d=4 m.

At the point in time $t_1$ a further measuring cycle of the filling-level measuring device is initiated. The received echo curve 1312 again comprises an echo EL2 1306, which is caused by the feed material surface 1304, and an echo EM2 1313, which is caused by a multiple reflection. The illustration clearly shows that the amplitude of the echo EL2 1306 exactly matches the amplitude profile 1311 of the amplitude profiler 701, whereas the amplitude of the multiple echo EM2 1313 does not match the amplitude profile 1311 at the location d=4 m.

At the point in time $t_2$ a new measuring cycle is initiated. The distance between the filling-level measuring device 1308 and the feed material surface 1304 at the point in time $t_2$ is now clearly less than the block distance B 1302 defined at the factory. It is thus no longer possible, within the received echo curve 1307, to pinpoint the reflection resulting from the feed material surface. If a device according to the hitherto-known state of the art were to be used, instead the distance to the multiple echo EM3 1314 would be output as the valid distance to the filling level. The device would not be in a position to detect overfilling of the container. If instead a device according to the present invention is used, then, within the amplitude evaluator 702, during a comparison of the amplitude of the echo EM3 1314 with the expected amplitude of the amplitude profile 1311 at the location of the echo EM3 it is detected that the aforesaid greatly differ from each other. Consequently, the echo EM3 cannot be the echo caused by the feed material surface 1304. The filling-level measuring device can thus in an automated manner deduce overfilling of the container.

Furthermore, as a result of the amplitude profile dynamically generated by the device, new opportunities of algorithmic evaluation open up.

For example, in the case of very substantial deviation of the amplitude of a reliably identified filling level echo from the expected value, or in the case of continuous change of already learned amplitude values, various causes can be considered. On the one hand this might indicate soiling of the antenna. On the other hand it might be possible to detect an electronics defect in such a manner. Furthermore, it may be possible to deduce foam buildup within the container. Moreover, it may be possible to calculate estimates relating to the dielectric constants of the medium or to a change in the dielectric constants during a change of media, because the aforesaid have a direct effect on the reflectivity and thus on the amplitude of the filling level echo.

Figure 14:
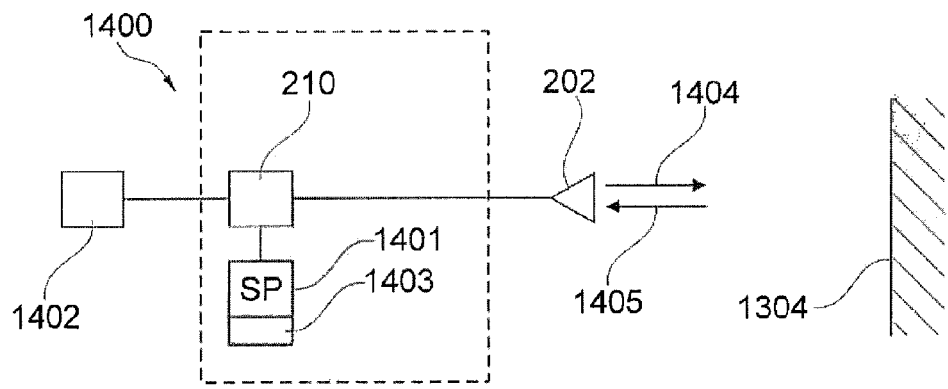
FIG. 14 shows an electronics unit according to a further exemplary embodiment of the invention.

FIG. 14 shows an electronics unit 1400 according to an exemplary embodiment of the invention. The electronics unit comprises among other things an arithmetic unit 210 that is provided for determining the functional relationship. The arithmetic unit 210 is connected to a storage device 1401. The storage device 1401 comprises a non-volatile storage region 1403 in which, for example, the functional relationship statistical parameters relating to the filling level amplitude and/or further important information can be stored, which information is then also available after a restart of the filling-level measuring device.

Furthermore, the arithmetic unit 210 is connected to the transmitting/receiving arrangement 202. The antenna arrangement 202 emits a transmit signal to the feed material surface 1304, which transmit signal is reflected from said feed material surface 1304 and is received as a receive signal 1405 by the antenna arrangement.

Furthermore, a higher-level control system 1402 is provided which forms part of the electronics unit 1400 or at least is connected to the electronics unit 1400. This higher-level control system can support or control the arithmetic unit 210.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. An electronics unit for a filling-level measuring device for determining a filling level, comprising:
    an arithmetic unit determining a functional relationship between a distance between a filling material surface and the filling-level measuring device and an amplitude of a signal component reflected by the filling material surface and received by the filling-level measuring device;
    an amplitude profiler creating a profile of amplitude values of filling level echoes which have been measured so far, the profile being a curve defined by the amplitude value of the filling level echoes and respective filling levels; and
    an amplitude evaluator determining an expected amplitude of the filling level echo at a particular location with help of the profile of amplitude values.

2. The electronics unit according to claim 1, further comprising:
    a storage device storing the functional relationship in a form of grid points.

3. The electronics unit according to claim 1, wherein the functional relationship is used for evaluating the echoes of an echo list.

4. The electronics unit according to claim 1, wherein the functional relationship is determined only when the filling-level measuring device has identified the filling level with good reliability.

5. The electronics unit according to claim 1, wherein determining the functional relationship is carried out only when the echo of the filling material surface changes its position over several measuring cycles.

6. The electronics unit according to claim 1, wherein when determining the functional relationship, at least one statistical parameter relating to the filling level amplitude is determined.

7. The electronics unit according to claim 6, wherein the at least one statistical parameter relating to the filling level amplitude is used for evaluating the echoes of an echo list.

8. The electronics unit according to claim 1, wherein the functional relationship is used for detecting the occurrence of an overfill situation.

9. The electronics unit according to claim 8, wherein the occurrence of an overfill situation is signaled to at least one of a user and a higher-level control system.

10. The electronics unit according to claim 2, wherein the storage device comprises a non-volatile storage region and wherein an occurrence of an overfill situation, the functional relationship, a track and/or at least one statistical parameter relating to the filling level amplitude is stored in the non-volatile storage region.

11. The electronics unit according to claim 10, wherein the information stored in the non-volatile storage region is read when the measuring device resumes operation, and is used for evaluating echoes.

12. A filling-level measuring device, comprising:
an electronics unit including (a) an arithmetic unit determining a functional relationship between a distance between a filling material surface and the filling-level measuring device and an amplitude of a signal component reflected by the filling material surface and received by the filling-level measuring device; (b) an amplitude profiler creating a profile of amplitude values of filling level echoes which have been measured so far, the profile being a curve defined by the amplitude values of the filling level echoes and respective filling levels; and (c) an amplitude evaluator determining an expected amplitude of the filling level echo at a particular location with help of the profile of amplitude values.

13. A method for determining a filling level with a filling-level measuring device, comprising:
emitting a transmit signal to a filling material surface;
detecting a receive signal that corresponds to the transmit signal;
determining a functional relationship between the distance between the filling material surface and the filling-level measuring device and an amplitude of a signal component of the receive signal, which signal component is reflected by the filling material surface and is received by the filling-level measuring device;
creating a profile of amplitude values of a filling level echo, which have been measured so far, the profile a curve defined by the amplitude values of the filling level echoes and respective filling levels; and
determining an expected amplitude of the filling level echo at a particular location with the help of the profile of the amplitude values.

* * * * *